United States Patent
Greco et al.

(10) Patent No.: US 11,501,502 B2
(45) Date of Patent: Nov. 15, 2022

(54) AUGMENTED REALITY GUIDED INSPECTION

(71) Applicant: INTERNATIONAL BUSINESS MACHINES CORPORATION, Armonk, NY (US)

(72) Inventors: Nancy Anne Greco, Lagrangeville, NY (US); Oded Dubovsky, Haifa (IL); Adi Raz Goldfarb, Akko (IL); John L. Nard, Buffalo, SC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/206,554

(22) Filed: Mar. 19, 2021

(65) Prior Publication Data
US 2022/0301266 A1    Sep. 22, 2022

(51) Int. Cl.
*G06T 19/00* (2011.01)

(52) U.S. Cl.
CPC ................ *G06T 19/006* (2013.01)

(58) Field of Classification Search
CPC ......... G06T 19/006; G06T 2207/30108; G06T 7/001; G06T 7/0002; G06T 7/0004; B64F 5/60; G05B 19/41805; G05B 19/41875; G06K 9/00671; H04W 4/029
See application file for complete search history.

(56) References Cited

U.S. PATENT DOCUMENTS

| 10,410,542 | B1* | 9/2019 | Stone ................... G09B 23/285 |
| 2009/0141964 | A1 | 6/2009 | Magara |
| 2012/0154594 | A1 | 6/2012 | Xie |
| 2014/0207419 | A1 | 7/2014 | Messinger |
| 2015/0039245 | A1 | 2/2015 | Langlois |

(Continued)

FOREIGN PATENT DOCUMENTS

ES    2643863 A1    11/2017

OTHER PUBLICATIONS

Amza, C. et al., "Augmented reality application for training in pipe defects ultrasonic investigation." MATEC Web of Conferences, vol. 121, 04001 (2017), DOI: 10.1051/matecconf/201712104001, 7 pages.

(Continued)

*Primary Examiner* — Chante E Harrison
(74) *Attorney, Agent, or Firm* — Caleb D. Wilkes

(57) ABSTRACT

A method, computer system, and a computer program product for augmented reality guidance are provided. Device orientation instructions may be displayed as augmented reality on a display screen of a device. The device may include a camera and may be portable. The display screen may show a view of an object. At least one additional instruction may be received that includes at least one word directing user interaction with the object. The at least one additional instruction may be displayed on the display screen of the device. The camera may capture an image of the object regarding the at least one additional instruction. The image may be input to a first machine learning model so that an output of the first machine learning model is generated. The output may be received from the first machine learning model. The output may be displayed on the display screen.

20 Claims, 9 Drawing Sheets

(56) References Cited

U.S. PATENT DOCUMENTS

| | | | |
|---|---|---|---|
| 2015/0056585 A1 | 2/2015 | Boulware | |
| 2015/0146007 A1* | 5/2015 | Dusik | G06K 9/6202 |
| | | | 348/161 |
| 2016/0104276 A1 | 4/2016 | Engel | |
| 2017/0360401 A1* | 12/2017 | Rothberg | G06K 9/66 |
| 2018/0131907 A1* | 5/2018 | Schmirler | G05B 23/0216 |
| 2018/0247023 A1* | 8/2018 | Divine | G06T 19/006 |
| 2019/0251750 A1* | 8/2019 | Brewer | G06F 3/0346 |
| 2019/0316912 A1* | 10/2019 | Maggiore | H04W 4/70 |
| 2020/0058161 A1* | 2/2020 | ReMine | G06T 7/593 |
| 2020/0090410 A1* | 3/2020 | Han | G06V 20/52 |
| 2020/0242796 A1* | 7/2020 | Yamada | G06T 7/74 |
| 2020/0250890 A1* | 8/2020 | Zhou | G06T 13/20 |
| 2021/0034870 A1* | 2/2021 | Ha | G06K 9/6202 |
| 2021/0149359 A1* | 5/2021 | Mehrotra | G05B 19/4183 |
| 2021/0275145 A1* | 9/2021 | de Jonge | A61B 8/02 |

OTHER PUBLICATIONS

IBM Institute for Business Value, "Expert Insights: Smart Manufacturing," May 2020, 07032207USEN-00, https://www.ibm.com/downloads/cas/ZLKE8R2X, 16 pages.

Mell et al., "The NIST Definition of Cloud Computing", National Institute of Standards and Technology, Special Publication 800-145, Sep. 2011, 7 pages.

Smart Industry, "Hear that? It's IBM's Acoustic Insights Program," Jan. 6, 2020, https://www.smartindustry.com/articles/2019/hear-that-its-ibms-acoustic-insights-program/, 3 pages.

\* cited by examiner

AUGMENTED REALITY GUIDED INSPECTION

BACKGROUND

The present invention relates generally to the fields of manufacturing, inspecting objects, training, and performing troubleshooting on systems, and more particularly to using augmented reality and machine learning to improve these fields.

SUMMARY

According to one exemplary embodiment, a method for augmented reality guidance is provided. Device orientation instructions may be displayed as augmented reality on a display screen of a device. The device may include a camera and may be portable. The display screen may show a view of an object. At least one additional instruction may be received that includes at least one word directing user interaction with the object. The at least one additional instruction may be displayed on the display screen of the device. The camera may capture an image of the object regarding the at least one additional instruction. The image may be input to a first machine learning model so that an output of the first machine learning model is generated. The output may be received from the first machine learning model. The output may be displayed on the display screen. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
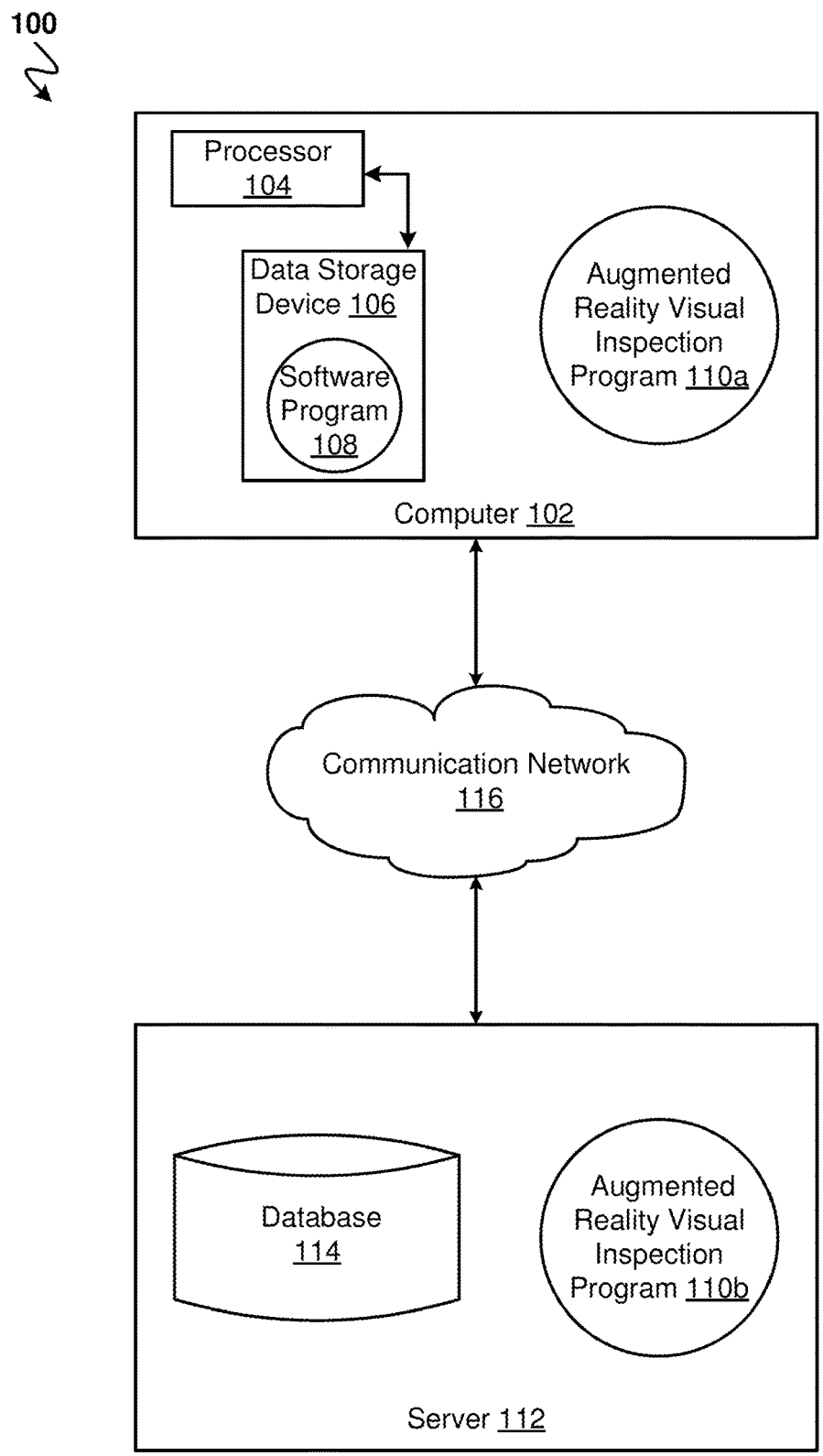
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for augmented reality visual inspection that may improve manufacturing inspection or object repair. The present embodiments may improve machine learning based visual analytics and acoustic models by helping a camera or another sensor to be more ideally positioned to capture images or other sensor information to feed to a machine learning model. The present embodiments have the capacity to improve manufacturing by increasing the speed of inspection and reducing the human oversight needed for the inspection process. The present embodiments have the capacity to improve the fields of repair such as automotive repair or computer repair by presenting guidance to a user and by using images of the current object or other information sensed from the object to identify problems with the setup of an object and physical solutions to those problems. The present embodiments also enable machine learning based visual or acoustic analytics to be performed at more diverse locations such as inside a car, under a car hood, at the exterior of a helicopter, etc. The present embodiments may improve the process for returning rental cars by streamlining a car review process to check for any damage accrued by a driver or to check for any existing damage before a rental period starts. The present embodiments may facilitate enhanced training of assembly workers and may help such worker develop expert assembly skills more quickly in that the worker can receive immediate feedback and inspection from assembly steps they have performed. The present embodiments may speed an overall manufacturing process by reducing an amount of manufacturing errors and issues that could be caused as a result further down the manufacturing line. The present embodiments may decrease overall inspection time and improve consistency of inspection in the time needed and in quality assurance.

The present embodiments may improve object inspection performed by humans, as the program and method may in an automated manner guide the human inspector to view appropriate inspection spots in the object. A high variability in the number of produced models and model types, e.g., for automobiles, exists. Distinguishing features of objects can vary so that key inspection points may be missed by an inexperienced or distracted human inspector. For example, a model type G87P has an additional backseat belt connector that for safety reasons needs to be inspected to ensure that proper installation occurred. The present embodiments may help prompt an inspector to perform this inspection and may prompt the inspector for the proper location for this inspection. The present embodiments may help eliminate the need for a second inspector or supervisor inspector to manually inspect another worker's assembly or repair step. The present embodiments may help generate, store, and show a corpus of best practice procedures that an inspector can easily see and access through augmented reality. The present embodiments may use multiple modules and multiple machine learning models and may leverage an edge device to enhance inspection, assembly, troubleshooting, etc.

Augmented reality ("AR") as used in the present disclosure may refer to the superimposition or overlaying of one or more of pictures, graphics, words, symbols, etc. onto a screen which is showing a view of an object. The screen may be part of a computer screen such as the screen of a cell phone, tablet, or laptop computer. The screen may be part of goggles, eyeglasses, contact lenses, a helmet screen, etc. that is/are worn on or near the eyes of a user. By looking at the screen with augmented reality, a user may see an object as presently constituted including any faults while also seeing instructions on the screen that help the user properly inspect the object and/or correct a problem on the object. One, two, or more machine learning models may be used with the methods and program of the present disclosure to perform sensor analytics and to generate sensor positioning instructions, inspection instructions, and/or assembly instructions and to evaluate step performance or perform troubleshooting.

A sensor as used in the present disclosure may refer to a visual sensor such as a camera, e.g., a video camera. Thus, when the sensor includes a camera the sensor positioning instructions may be referred to as camera positioning instructions. A sensor may also refer to an acoustic sensor, e.g., a sensor that uses acoustic waves, e.g., ultrasonic waves. A sensor may also refer to a Lidar sensor that uses laser light. References in the disclosure to a camera may be replaced by one of the alternative sensors.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an augmented reality visual guidance program 110a. The networked computer environment 100 may also include a server 112 that is a computer and that is enabled to run an augment reality visual guidance program 110b that may interact with a database 114 and a communication network 116. The networked computer environment 100 may include a plurality of computers 102 and servers 112, although only one computer 102 and one server 112 are shown in FIG. 1. The communication network 116 allowing communication between the computer 102 and the server 112 may include various types of communication networks, such as the Internet, a wide area network (WAN), a local area network (LAN), a telecommunication network, a wireless network, a public switched telephone network (PTSN) and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communication network 116. The communication network 116 may include connections, such as wire, wireless communication links, or fiber optic cables. As will be discussed with reference to FIG. 7, server 112 may include internal components 902a and external components 904a, respectively, and client computer 102 may include internal components 902b and external components 904b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. The client computer 102 will typically be mobile and include a display screen and a camera. According to various implementations of the present embodiment, the augmented reality guidance program 110a, 110b may interact with a database 114 that may be embedded in various storage devices, such as, but not limited to a computer/mobile device 102, a networked server 112, or a cloud storage service.

According to the present embodiment, a user using a client computer 102 may use the augmented reality guidance program 110a, 110b to receive expedited training for inspection of assembly work or manufacturing work that has been completed or for troubleshooting. An augmented reality guidance process is explained in more detail below with respect to FIGS. 2-6. Augmented reality annotations may be provided on a display screen of a computer and/or camera that a user is operating. The display screen may be on goggles, eyeglasses, contact lenses, a helmet screen, etc. that is/are placed on or near the eyes of a user. The display screen may alternatively be the screen of a tablet or cell phone screen. The computer 102 which may, for example, be a cell phone, a tablet, or a laptop may be considered to be an edge device for the performance of the augmented reality guidance procedure.

Figure 2:
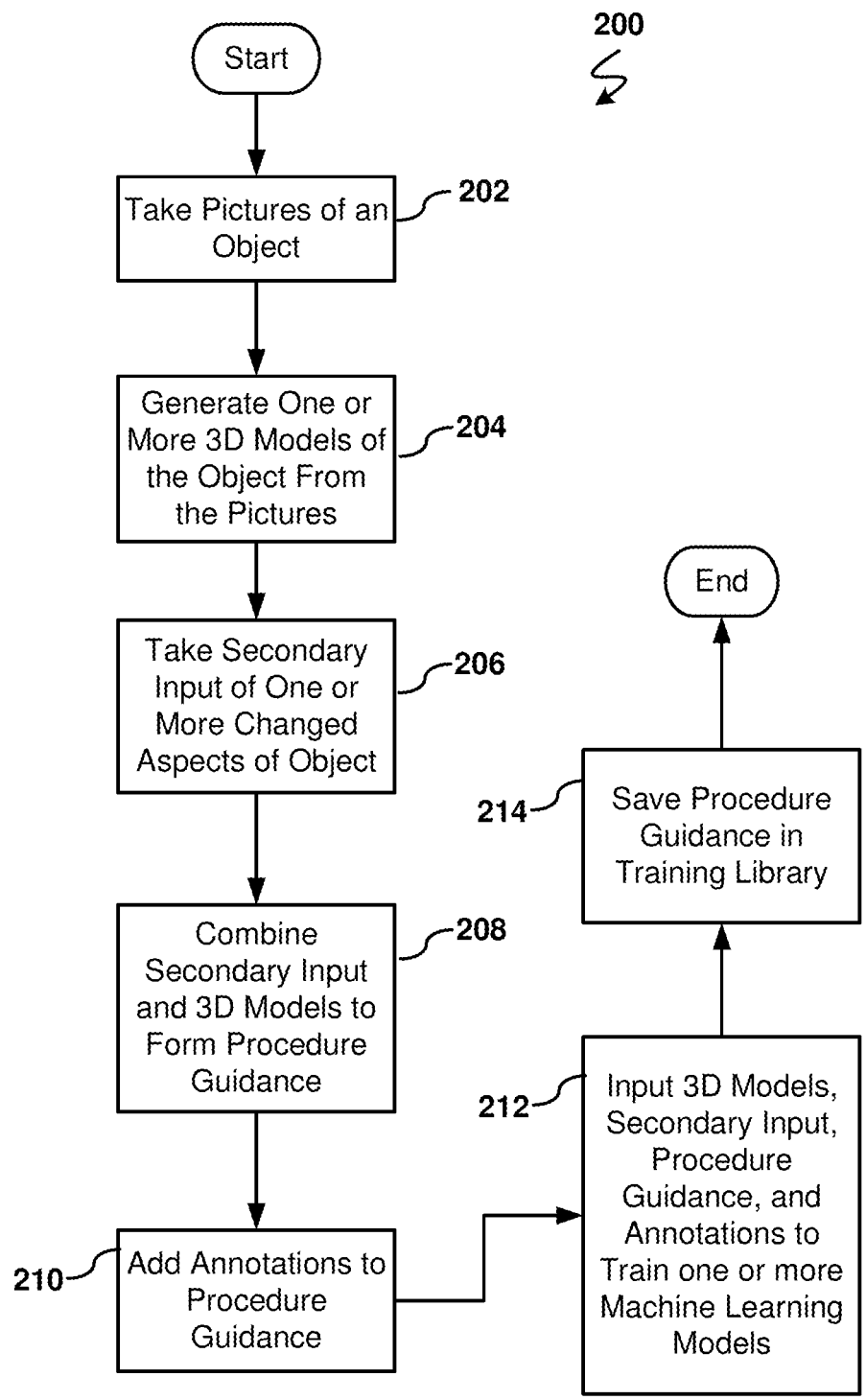
FIG. 2 is an operational flowchart illustrating a guidance procedure creation process for augmented reality guidance according to at least one embodiment.
Figure 3:
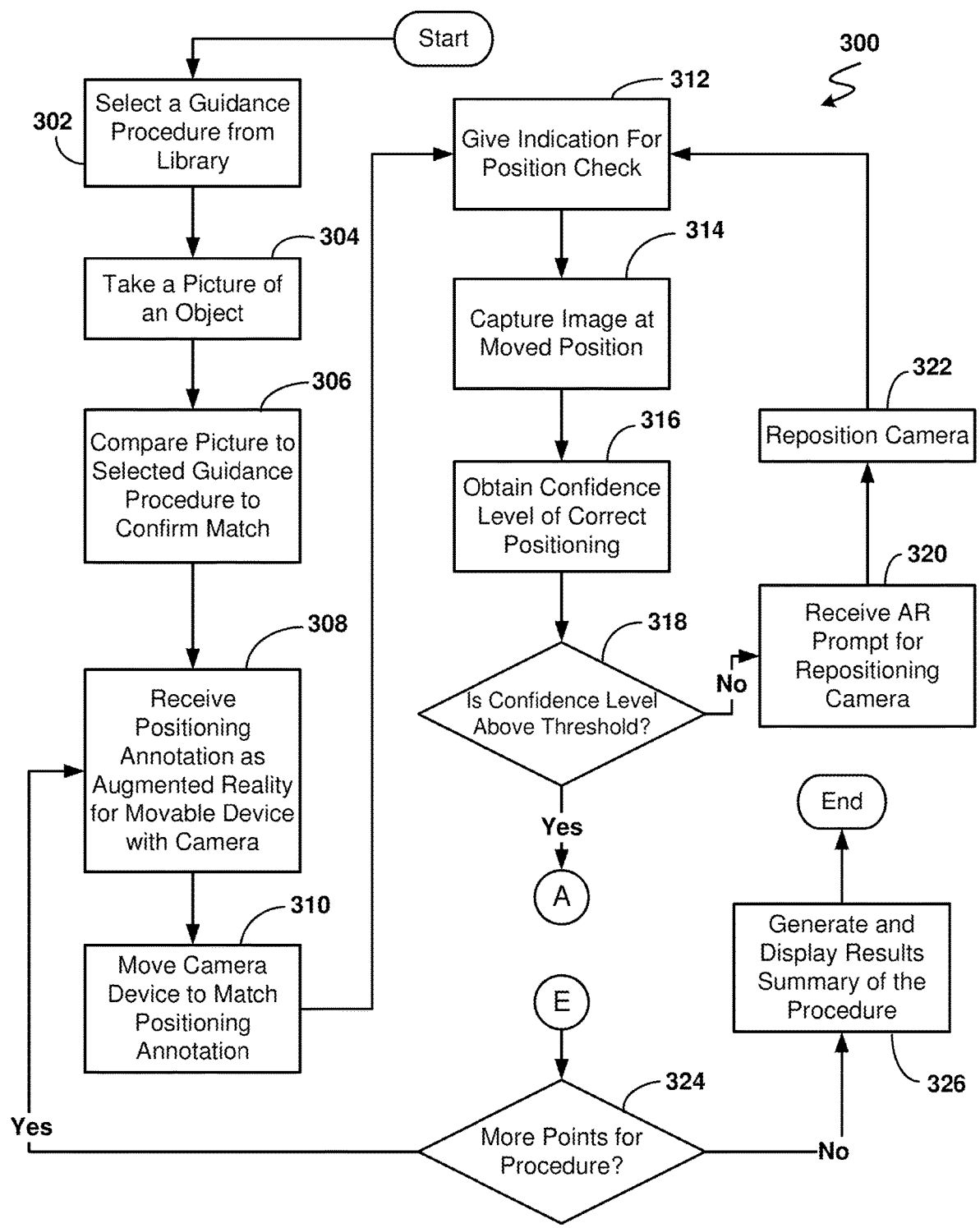
FIG. 3 shows an operational flowchart illustrating an augmented reality guidance process according to at least one embodiment.

Referring now to FIG. 2, an operational flowchart depicts a guidance procedure creation process 200 that may, according to at least one embodiment, be performed by the augmented reality guidance program 110a, 110b. This guidance procedure creation process 200 may be used to create an augmented reality guidance procedure. FIG. 3 which will be described subsequently describes the performance of an augmented reality guidance procedure in an augmented reality guidance process 300.

In a step 202 of the guidance procedure creation process 200, pictures of an object are taken. This taking of pictures of step 202 may encompass taking video footage of the object. The pictures may be taken of various views and angles of an object. For example, a user may use a camera to take pictures or a video of an object that is an automobile. The user may move a camera to various positions in order to obtain pictures or video of the object, e.g., the automobile, from different angles and different perspectives. For objects which have an actuatable component that changes the overall three-dimensional (3D) appearance of the object, pictures and/or video may be taken of the object in an actuated position and in a non-actuated position. For example, for an automobile pictures and/or video may be taken of the automobile with the hood closed and then also with the hood open.

In a step 204 of the guidance procedure creation process 200, one or more three-dimensional, i.e., 3D, models of the object are generated from the pictures. In some embodiments, the augmented reality guidance program 110a, 110b may include 3D model generation software in which pictures or video may be uploaded into the 3D generation software and the 3D model generation software outputs a 3D model. Such 3D model generation software may be stored in the computer 102, e.g., in the data storage device 106, or may be stored in the server 112. For those embodiments where a 3D model generation software of the augmented reality guidance program 110a, 110b is located in the cloud, the 3D model generation software may be stored in the server 112. For this embodiment, step 204 may include a user or operator sending image files or video files via the communication network 116 from (1) a location of a camera taking pictures and/or video to (2) the location of the 3D generation software, e.g., at the server 112. Such 3D model generation may include implementing principles of photogrammetry. Various free and/or open source software is available to generate 3D models from an input of photos or videos. The multiple photos may include a sequence of photos. The 3D models may be point cloud models, mesh models, etc. The 3D model may be used in computer aided design (CAD) software or in building information modeling (BIM) software which may be part of the augmented reality guidance program 110a, 110b.

For an example of an object with an actuatable component which changes the appearance of the object, multiple 3D models may be generated in step 204. For example, for the automobile a first 3D model may be generated of the automobile in the normal view of the automobile with the hood closed. A second 3D model may be generated of the automobile with the hood opened so that the engine and associated components are viewable.

In a step 206 of the guidance procedure creation process 200, secondary input of one or more changed aspects of the object are taken. This taking of secondary input in step 206 may encompass using a camera to take pictures and/or video of the one or more changed aspects of the object. A changed aspect may include a fault situation of the object where one or more components of the object are disengaged from an optimal position or are broken. A changed aspect of an automobile engine may include a cable in the engine being disconnected from a normal connection port. The pictures may be of a component of the object and may include different versions of the component, such as installed and functioning, broken, disconnected, etc. For embodiments where the guidance procedure is intended to help guide product assembly, this taking of secondary input may include taking pictures of the object at various intermediate stages of the assembly of the product before the final product is completed. For embodiments where the guidance procedure is intended to help inspect a manufactured object, this taking of secondary input may include providing pictures of defects in a manufactured object, e.g., a picture of a dented wall in a manufactured car door. This taking of secondary pictures in step 206 may encompass the taking of video of the changed aspect of the object. This taking of secondary input in step 206 may encompass using a microphone to record audio of the object. For example, for an object that is an automobile the microphone may record sounds of the engine running and may record sounds of the engine running when some aspect of the engine or car system is broken or not functioning correctly as well as when the engine is running well.

In a step 208 of the guidance procedure creation process 200, secondary input taken in step 206 and the one or more 3D models generated in step 204 are combined to form a guidance procedure. This step 208 may include the uploading of taken secondary pictures and/or audio into the augmented reality guidance program 110a located in the computer 102 or into the augmented reality guidance program 110b in the server 112. Picture files, video files, and/or audio files may be transmitted via the communication network 116 in order for the files to be uploaded into the augmented reality guidance program 110b in the server 112 that may be located remotely from the location of a camera where the picture was taken. The augmented reality guidance program 110a, 110b may incorporate the secondary pictures into the 3D model that was generated so that slight variants of the 3D models are generated and stored. A 3D model of a car with its hood open and with an unconnected cable may be generated as a slight variant. The secondary pictures may be submitted with metadata labeling to define their fault situation.

In a step 210 of the guidance procedure creation process 200, annotations are added to the procedure guidance that was formed in step 208. The annotations may be related to one or more locations of particular components in the object or to instructions for user interaction with the object, for example via assembly or repair. The annotations may give guidance to a subsequent user of the augmented reality guidance process as to where to place a camera to obtain a best view of a component. The annotations may include words, arrows, shapes, two-dimensional images, etc. that may be overlaid on, superimposed over, or augmented to a portion of a picture which is an instance of the 3D model of the object. An arrow that points to a connection port for connecting a cable may be placed onto the 3D model. A two-dimensional image that shows a cable being optimally connected to a connection port may be such an annotation. Word annotations may include phrases such as "move the camera up", "move the camera down", etc. An annotation may include one or more markers which help indicate an optimal alignment position for a camera taking a picture of the object. The annotation may guide the user to move or orient the camera to achieve a maximal overlap between a current real image being taken and the image from the 3D model.

In a step 212 of the guidance procedure creation process 200, the one or more 3D models, the secondary input, the procedure guidance, and the annotations are input into a machine learning model to train one or more machine learning models. Machine learning models for step 212 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The process of training a machine learning model may include providing training data to a learning algorithm or to a machine learning algorithm. The machine learning model is the model structure or system that is created by the training process. The training data should include targets or target attributes which include a correct answer. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 102 or at another computer associated with the server 112. The machine learning model that is generated may be stored on computer 102 or on the server 112 or on another external server accessible to the computer 102 and to the server 112 via the communication network 116. The automated learning may be performed via a machine learning model on the device or in the cloud. Using a machine learning model on the device helps reduce data transmission required between the device and a server in the cloud. Such a mobile machine learning model may be performed using inference-based machine learning models such as TensorFlow® Lite (TensorFlow® and all TensorFlow®-based trademarks and logos are trademarks or registered trademarks of Google, Inc. and/or its affiliates).

The machine learning model or models that are generated may be setup for receiving pictures of an object and/or audio recordings as input into the machine learning model and for generating, as output confirmations, one or more of correct object setup instructions, assembly instructions, identifications of errors in setup, assembly, or manufacturing, confirmation or approval of assembly or manufacturing steps performed.

For inspection procedures, compliance procedures, or assembly procedures with multiple inspection or guide points in the procedures, a separate machine learning model may be generated for each point of the procedure. Thus, one guidance procedure may use multiple machine learning models to complete the process. For example, one machine learning model may be generated for a visual inspection of a component of an object. Another machine learning model may be generated for an audio inspection of a functioning of the object, e.g., for operation of an engine and with audio samples input of a functioning engine and a struggling engine.

In a step 214 of the guidance procedure creation process 200, the procedure guidance that was formed is saved in a training library. A user may provide input into a keyboard to actuate a graphical user interface (GUI) button in the augmented reality guidance program 110a, 110b in order to save a procedure guidance. The training library may be saved in data storage at the computer 102, e.g., in the data storage device 106, or in the server 112, e.g., in the database 114.

After step 214 is performed, the guidance procedure creation process 200 may end so that the guidance procedure may be used to guide a user through the procedure, e.g., through an assembly, through an inspection, through troubleshooting, etc.

Referring now to FIG. 3, an operational flowchart depicts an augmented reality guidance process 300 that may, according to at least one embodiment, be performed by the augmented reality guidance program 110a, 110b. The augmented reality guidance process 300 may perform an augmented reality guidance procedure that was created in the guidance procedure creation process 200 that was shown in FIG. 2

In step 302 of the augmented reality guidance process 300, a guidance procedure is selected from a library. The guidance procedure that is selected may be a guidance procedure that was created in the guidance procedure creation process 200 that was shown in FIG. 2. Opening the augmented reality guidance program 110a on the computer 102, which may be a portable tablet or cell phone with a display screen, may generate the display of various 3D models and guidance programs that are stored in a library.

The user may use an input device such as a keyboard of the tablet or of the cell phone to scroll up or down in a list and then actuate the entry in the list or a start GUI button on the screen to select a 3D model and/or a guidance program.

In step 304 of the augmented reality guidance process 300, a picture of an object is taken. This taking of the picture for step 302 may include taking video images of the object. A user may take a cell phone or another portable computer device into a vicinity of the object and take one or more pictures of the object. Step 304 may be initiated by the augmented reality guidance program 110a generating a prompt on a display screen of the computer 102 that instructs a user to take a picture of the object or to scan the object with a camera. Such a prompt may include the instructions "Scan the object to enable AR lockdown."

In step 306 of the augmented reality guidance process 300, the picture taken in step 304 is compared to the selected guidance procedure to confirm a match. This step 306 may include the uploading of the picture into the augmented reality guidance program 110a located in the computer 102 or into the augmented reality guidance program 110b in the server 112. Picture and/or video files may be transmitted via the communication network 116 in order for the files to be uploaded into the augmented reality guidance program 110b in the server 112. The server 112 may be located remotely from the location of a camera where the picture was taken. This step 306 may include inputting the picture file into a 3D model, e.g., into one of the 3D models that was created in step 204 of the guidance procedure creation process 200. The 3D model may be able to recognize whether an image matches a 3D model that is stored. Inputting an image into the 3D model may generate an output of a match or a non-match of the image and the object represented by the 3D model.

When the match occurs in step 306, a picture of the 3D model may be superimposed onto a display screen of the camera or computer 102 to demonstrate a match between the currently viewed object and the object the compared 3D model stored in the library. For example, if a user takes a picture of a car model X from a front view of the car and uploads this picture into the augmented reality guidance program 110a and if the car model X is the object in the selected guidance procedure, then a picture of the car model X from the 3D model may be superimposed on the screen of the user to indicate the match.

In step 308 of the augmented reality guidance process 300, a positioning annotation as augmented reality for a movable device with a camera is received. The positioning annotation may include an arrow indicating or pointing to an inspection point within the object. The positioning annotation may be referred to as and may be an example of a device orientation instruction. As the device may include a camera, the device orientation instruction may in some embodiments be referred to as a camera orientation instruction. The positioning annotation may also include a frame marker which indicates a region surrounding an inspection point. If the border of the camera view is placed to match the frame marker, then the main view of the camera may be focused on the inspection point. The receiving of step 308 may include displaying the positioning annotation on a display screen of the camera or of the computer 102 which a user is using to perform the augmented reality guidance process 300 and to take pictures. The positioning annotation may include an X-Y-Z coordinate scale displayed on the screen over the live view of the object.

In step 310 of the augmented reality guidance process 300, the camera device is moved to match the positioning annotation. The camera device or sensor may be portable or movable and may be hand-held to allow maximum versatility of the different inspection, troubleshooting, or assembly procedures that may be guided with the augmented reality guidance program 110a, 110b. A user may move while holding the camera in order to perform step 310. A user may stay stationary but use hand or arm movements to tilt the camera to change an angle of the camera. This movement may include a user zooming the viewpoint in or out.

In step 312 of the augmented reality guidance process 300, an indication for a position check is given. This indication may be given by a user touching a GUI button displayed on a display touch screen of the computer 102 or actuating a button of a keyboard of the computer 102. In some embodiments, keeping the device and program on, and not turning it off or ending the program, will automatically give the indication to perform the position check. Thus, with this embodiment the augmented reality guidance program 110a, 110b continually checks the position until a position match is achieved.

In step 314 of the augmented reality guidance process 300, an image is captured by the movable camera at the moved position. This image may be captured by a user touching a GUI button displayed on a display touch screen of the computer 102 or actuating a button of a keyboard of the computer 102. This image may be taken automatically in a video mode or in a constant picture taking mode of the augmented reality guidance program 110a, 110b.

In step 316 of the augmented reality guidance process 300, a confidence level of correction positioning of the camera in the moved position of step 314 is obtained. This step 316 may include inputting the image taken in step 314 into a 3D model, e.g., the 3D model that was generated in step 204, or into a machine learning model, e.g., a machine learning model that was generated or trained in step 212 of the guidance procedure creation process 200 shown in FIG. 2. The 3D model or the machine learning model may give as an output the confidence level that the user has moved the camera to the correct position for an inspection point. The augmented reality guidance program 110a, 110b may use a processor 104 of the computer 102 to compare the taken image of step 314 to the 3D model or to a variant of the 3D model to ascertain a confidence level.

In step 318 of the augmented reality guidance process 300, a determination is made whether the confidence level is above a threshold. 75% and 85% are non-limiting examples of threshold levels of the confidence level. The augmented reality guidance program 110a, 110b may use a processor 104 of the computer 102 to make this confidence level determination. If the confidence level is above or at a threshold or threshold level, the augmented reality guidance process 300 proceeds to point A which refers to the next process shown in FIG. 4. If the confidence level is below or is not above a threshold, the augmented reality guidance process 300 proceeds to step 320. If the confidence level is above or at a threshold or threshold level, the user at the sensor or the camera may receive a sensor alignment confirmation. The sensor or camera may present, e.g., display, e.g., as augmented reality, or announce, the sensor alignment confirmation.

In step 320 of the augmented reality guidance process 300, an augmented reality prompt for repositioning the camera is received. The prompt may be a text box saying which direction the camera should be moved to achieve correct alignment for an inspection point. For example, the text box prompt may say "Move the camera up". The augmented reality prompt may additionally or alternatively include an arrow that is displayed on the screen and points to a direction that the camera should be moved to achieve the correct alignment. The receiving of step 320 may include displaying the augmented reality prompt on a display screen of the computer 102.

In step 322 of the augmented reality guidance process 300, the camera is repositioned. The camera device may be portable or movable and may be hand-held to allow maximum versatility of the different inspection, troubleshooting, or assembly procedures that may be guided with the augmented reality guidance program 110a, 110b. A user may move while holding the camera in order to perform step 310. A user may be stationary but use hand or arm movements to change an angle of the camera. A repositioning of the camera may include zooming the view in or out.

After the completion of step 322, the augmented reality guidance process 300 may return to step 312 for a repeat performance of steps 312, 314, 316, and 318. These steps may create a loop that is repeated iteratively until the camera is positioned in the correct position as defined by the positioning annotation that was received in step 308.

Figure 4:
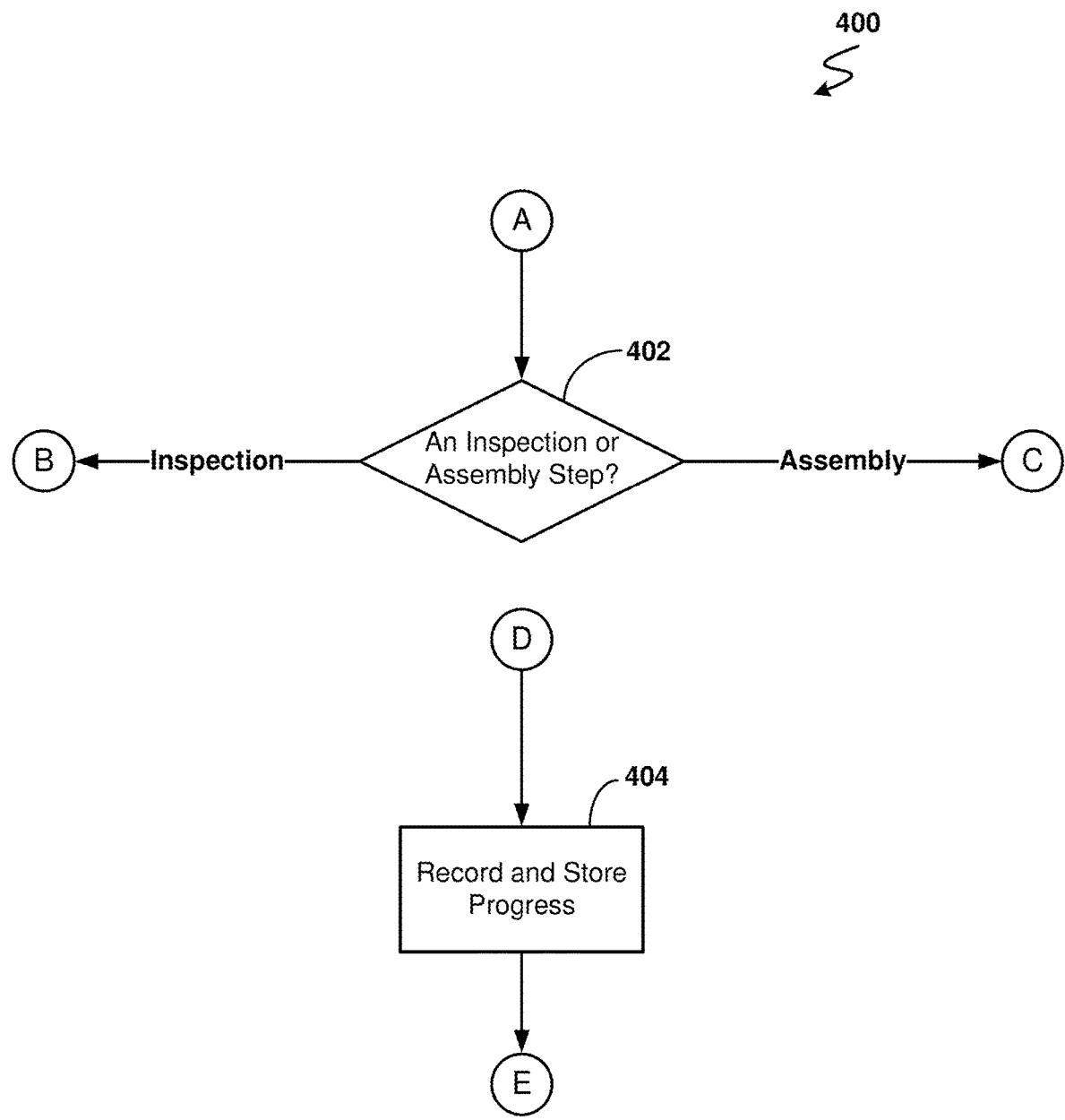
FIG. 4 shows an operational flowchart illustrating a user interaction guidance process according to at least one embodiment.

If the confidence level obtained in step 316 is above or at a threshold, the augmented reality guidance process 300 may proceed to point A which refers to a process shown in FIG. 4. After completion of the process shown in FIG. 4, the augmented reality guidance process 300 may return to point E shown in FIG. 3.

In step 324 of the augmented reality guidance process 300, a determination is made as to whether the guidance procedure has more points. A number of points for a guidance procedure may be accessed by the processor 104 and evaluated to learn if the guidance procedure is finished or has additional points to be inspected and/or assembled. If the guidance procedure does not have more points, then the augmented reality guidance process 300 may proceed to step 326. If the guidance procedure has more points to cover, then the augmented reality guidance process 300 proceeds to step 308 for repeating of the steps 308 to flowchart point A (and eventually to flowchart point E) for the next guidance point in the guidance process. This repeat of steps 308 to flowchart point E for additional steps may incorporate, in the repeat of the user interaction guidance process 400 shown in FIG. 4, in the inspection step sub-process 500 shown in FIG. 5 or in the assembly step sub-process 600, the usage of a different machine learning model for each guidance point in the procedure. Such multiple machine learning models may have been generated from the incorporation of multiple secondary inputs that were taken and used in steps 206 and 212 of the guidance procedure creation process 200 that is shown in FIG. 2. Moreover, the steps 308 to 318 may be performed by a location module of the augmented reality guidance program 110a, 110b.

In step 326 of the augmented reality guidance process 300, a results summary of the procedure may be generated and displayed. The display may occur on the screen of the device, e.g., of the camera or of the computer 102 that acts as a camera. The augmented reality guidance program 110a, 110b may analyze the success and feedback of the procedure to generate the results summary. For example, the results summary may include a fail rate for an inspection, a pass rate for an inspection, a total number of inspection photos taken, and a total number of photos that were collected during the procedure. The results summary may give the user a broader view of the success of the manufacturing, of the assembly, of the troubleshooting, etc.

After step 326, the augmented reality guidance process 300 may proceed to the end of the augmented reality guidance process 300.

The augmented reality guidance process 300 may also include providing one or more instructions as AR to guide the user to proceed to a different view or 3D model of the object. For example, if the engine of a car is being inspected an instruction may be indicated as AR on the screen to "Pickup hood". This AR may include an arrow or line pointing to the location of the hood on the screen. As explained above, the augmented reality guidance program 110a, 110b may have a separate 3D model for the view of the automobile that shows the hood open and the engine visible. The augmented reality guidance program 110a, 110b may take pictures or video to recognize when a user has manually opened the hood.

Such instructions might also include instructions for removing screws of an exterior panel of a machine in order to enable a view of internal components of such machine.

FIG. 4 shows a user interaction guidance process 400 which may be performed along with the augmented reality guidance process 300. The user interaction guidance process 400 may begin from flowchart point A from the augmented reality guidance process 300 shown in FIG. 3. A user interaction may refer to a user interacting with the object being examined. Such user interaction may include an inspection of a point of the object or may include an assembly step and inspection for the object.

Figure 5:
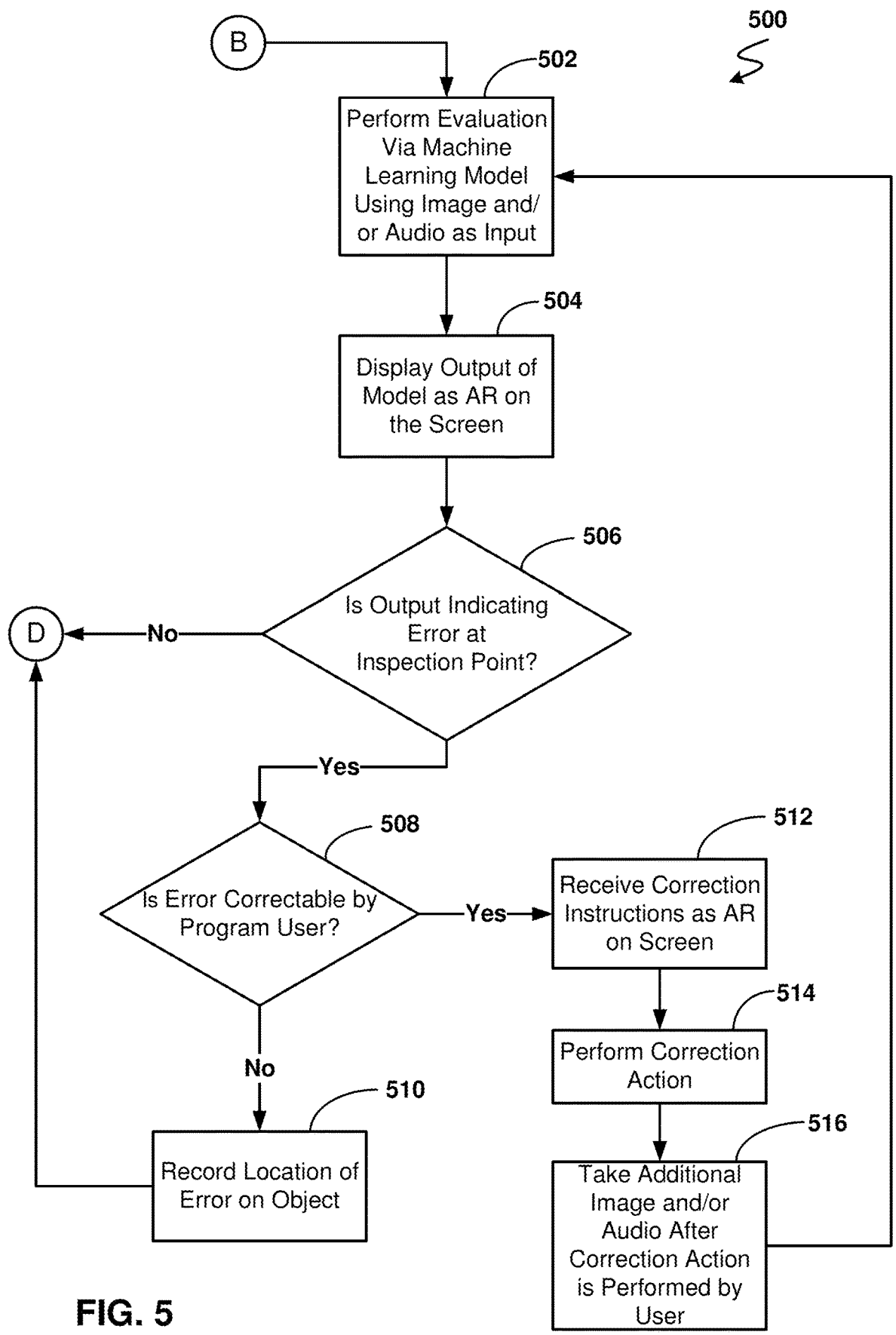
FIG. 5 shows an operational flowchart illustrating example of an inspection process according to at least one embodiment and that is a sub-process of the user interaction guidance process shown in FIG. 4.
Figure 6:
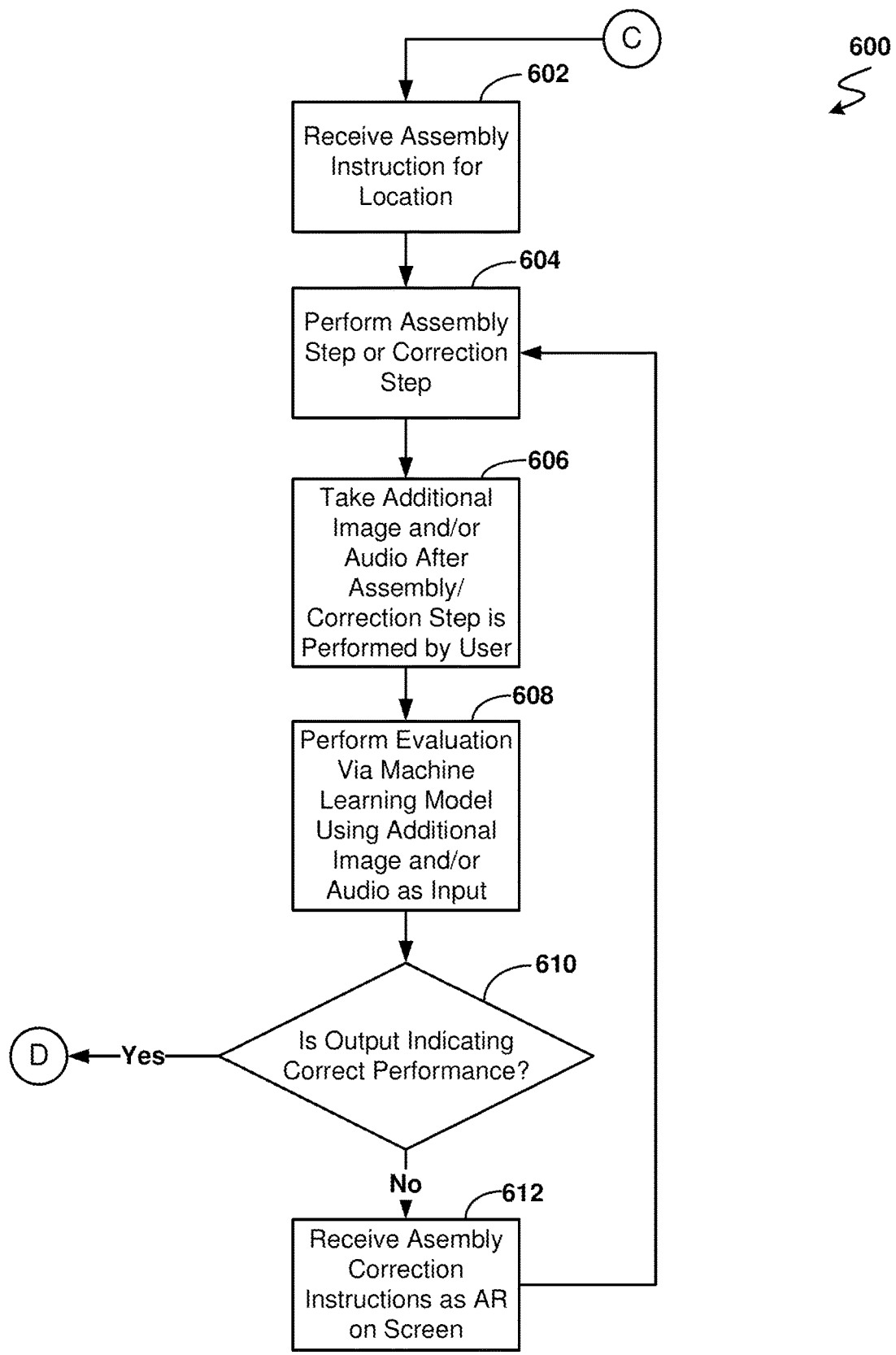
FIG. 6 shows an operational flowchart illustrating example of an assembly process according to at least one embodiment and that is a sub-process of the user interaction guidance process shown in FIG. 4.

After flowchart point A shown in FIG. 4, in step 402 of the user interaction guidance process 400 a determination is made as whether an inspection step or an assembly step is to happen next. The operating files of the guidance procedure creation process 200 may indicate whether the guidance procedure creation process 200 is at an inspection step or an assembly step. The guidance procedure creation process 200 may be pre-programmed by a user or another user to indicate the type of step that is to be performed. If the user interaction guidance process 400 is at an inspection step, then the flowchart point B is next which leads to the inspection step sub-process 500 which is shown in FIG. 5. If the user interaction guidance process 400 is at an assembly step, then the flowchart point C is next which leads to the assembly step sub-process 600 which is shown in FIG. 6.

After the completion of either the inspection step sub-process 500 or the assembly step sub-process 600, the user interaction guidance process 400 resumes at flowchart point D. After flowchart point D, in reality guidance process 300 step 404 of the user interaction guidance process 400 the progress of the augmented reality guidance process 300 is recorded and stored. The flowchart point D helps clarify the link between the augmented reality guidance process 300 and the inspection step sub-process 500 and the assembly step sub-process 600. In step 404, the successful achievement of an assembly step or status of a component that was used in assembly or manufacturing and that was determined in the step may be recorded and stored in a computer memory associated with the augmented reality guidance program 110a, 110b. For example, the outcome of the step may be saved in the data storage device 106 of the computer 102 or in the database 114 of the server 112.

FIG. 5 shows the inspection step sub-process 500 which is performed as a part of the user interaction guidance process 400 for an inspection step. The inspection step may be part of a review of a manufacturing process for which the manufacturing process should be completed so that the object may be finished or at least partially finished.

In step 502 of the inspection step sub-process 500, an evaluation via a machine learning model may be performed by using the inspection image and/or a captured audio recording as input. This machine learning model may be one of the machine learning models that were created in step 212 of the guidance procedure creation process 200 that was shown in FIG. 2. The inspection image may be that image captured or taken in step 314 of the augmented reality guidance process 300 shown in FIG. 3. For an inspection that uses sound to check the quality or correctness of an object, an audio file may be captured and also fed into a sound-based machine learning model. The machine learning model may be stored locally on the computer 102 or in the cloud, e.g., at the server 112. This step 502 may include uploading the picture from a camera of or associated with the computer 102 to the augmented reality guidance program 110a. This step 502 may include capturing via a microphone associated with or connected to the computer 102 a sound or audio recording of the object and uploading the audio recording to the computer 102 This step 502 may include transmitting a picture file and/or an audio file via the communication network 116 to the augmented reality guidance program 110b located in the cloud on the server 112. The evaluation process may occur more quickly if the evaluation occurs locally at the camera device, e.g., at the augmented reality guidance program 110a at the computer 102.

For some embodiments, listening to an object may result in obtaining information about the correct operation and manufacturing or assembly of the object. For example, the sound of the engine of an automobile running may give insight regarding the operation and correction of the engine, of sub-components of the engine, or of car systems connecting to the engine. A microphone may be connected to the computer 102 or camera and may capture a sound of the engine running. A display prompt may visually or audibly be generated on the edge device which prompts the operator to run the engine so that the sound of the engine running may be recorded.

In step 504 of the inspection step sub-process 500, an output of the machine learning model is displayed as augmented reality on the screen of the user. The output may indicate a quality approval of the inspection point or some error of the object at the inspection point. For an inspected object, the output may be that no problems or errors with the object are identified. Alternatively, the output may be a defect is identified at the inspection point. For example, a wall of the object may be dented or a connection cable may be disconnected at the inspection point. The output may be displayed as a text box or as plain letters with no surrounding box superimposed over a view of the object on the screen. The output may be displayed with a confidence level that the machine learning model has for the evaluation. A confidence level threshold for an evaluation output choice may also be provided by the machine learning model and displayed on the display screen as AR over the view of the object.

In step 506 of the inspection step sub-process 500, a determination is made whether the output from step 504 indicates an error at the inspection point. The processor 104 may recognize, interpret, and/or evaluate the output of the machine learning model. If the output indicates no error, then the inspection step sub-process 500 may be concluded and proceed to flowchart point D which leads back to the user interaction guidance process 400 shown in FIG. 4. If in step 506 the output indicates an error at the inspection point, then the inspection step sub-process 500 proceeds to step 508.

In step 508 of the inspection step sub-process 500, a determination is made whether the error identified in steps 504 and 506 is correctable by the program user. If the error is correctable by the program user, then the inspection step sub-process 500 proceeds to step 512. If a user can correct the error by, for example, plugging in a connection plug into a connection port, the augmented reality guidance program 110a, 110b may recognize same and provide guidance to the inspector to make the error correction. If a component of the object was broken in two, then correction by the inspector may not be achievable. If the error is not correctable by the program user, then the inspection step sub-process 500 proceeds to step 510.

In step 510 of the inspection step sub-process 500, the location of the error on the object is recorded. If the error was a component that is broken or a dented wall of the object, the location of the defect may be recorded in computer memory associated with the augmented reality guidance program. For example, the location may be stored in the data storage device 106 of the computer 102 or in the database 114 in the server 112.

After step 510 is performed, the inspection step sub-process 500 may conclude as indicated at flowchart point D so that a remainder of the user interaction guidance process 400 may be completed or undertaken. FIG. 4 shows that flowchart point D of the user interaction guidance process 400 is followed by step 404 for recording and storing progress of the augmented reality guidance procedure.

In step 512 of the inspection step sub-process 500, correction instructions are received as augmented reality on the screen. Step 512 may be undertaken if in step 508 a determination was made that the error identified in steps 504 and 506 is correctable by the program user. The augmented reality may include words, symbols, arrows, and/or a picture that is displayed superimposed over a view of the object. If a cable is disconnected, a picture may be displayed showing a view of the cable being properly connected. This augmented reality may include a video of a person properly connecting the cable. The video may be displayed in a screen region near or adjacent to a viewpoint of the inspection area or the inspection point. The augmented reality may include a moving arrow showing a direction of thrusting the cable to achieve the connection. The augmented reality guidance program 110a, 110b may include the correction instructions stored in its memory or may search the web and find video and/or image of the object and/or object component to display in an overlaid manner over the object view as augmented reality.

In step 514 of the inspection step sub-process 500, a correction action is performed by the user. The user may, for example, plug in the disconnected cable into the connection port in an automobile engine. The action may be performed by a user using their own hands with or without additional tools.

In step 516 of the inspection step sub-process 500, an additional image and/or audio of the object is taken after the correction action is performed by the user. This taking of the additional image for step 516 may include taking video images of the object. A user may press one or more buttons on a keyboard or touch a graphics user interface (GUI) button on a touch screen to actuate image capturing by the camera and/or audio recording by a microphone connected to the computer and/or to the camera. Alternatively, images or videos and/or audio may be constantly being taken and uploaded by the camera of the augmented reality guidance program 110a so that step 516 may occur automatically after the correction action performance in step 514. For a constant mode a user may pause or interrupt picture taking or sound recording by actuating a pause button via a keyboard or the touch screen.

After step 516 of the inspection step sub-process 500, step 502 of the inspection step sub-process 500 may be repeated by inputting the additional image and/or audio taken in step 516 into the machine learning model. Steps 504 and 506 may also be repeated.

Thus, the inspection step sub-process 500 shows an iterative loop that may be repeated until the augmented reality guided program 110a, 110b indicates no error at the inspection site or identifies the error as being uncorrectable by the program user. If the loop is ended by no error or by an uncorrectable error being determined, then the inspection step sub-process 500 may conclude with step 510 and then to flowchart point D so that a remainder of the user interaction guidance process 400 may be completed or undertaken. FIG. 4 shows that point D of the user interaction guidance process 400 is followed by step 404 for recording and storing progress of the augmented reality guidance procedure.

The inspection step sub-process 500 may additionally include steps of providing AR guidance to a user to guide them to physically test the success of a correction step. For example, AR guidance may be generated and shown which instructs the user to "carefully pull to ensure connection", for example, to physically check whether connection latches fully engaged.

FIG. 6 shows the assembly step sub-process 600 which is performed as a part of the user interaction guidance process 400 for an assembly step. The assembly step may be part of a manufacturing process of the object. For example, the assembly may be the assembling of a printed circuit board for a computer.

In step 602 of the assembly step sub-process 600, one or more assembly instructions for the location are received. This receiving of step 602 may include displaying the assembly instructions as augmented reality onto a screen being viewed by the user. The assembly instructions may, for example, say "Place four C34 screws in the highlighted positions". Such text may be in a peripheral region of the screen so that a central region of the screen may include symbols or pointers to point to the location of the assembly action. Thus, a user may be able to read the AR instructions on the screen to learn a next step for the assembly and may be able to view a location AR symbol to know the location for the assembly step. Other examples of assembly instructions may be to "Insert the battery in the correct polarity" and "Apply pressure into the heatsink". The screen may display as AR the appropriate orientation for the battery to achieve the correct polarity. For example, a "+" sign may be shown as AR near the location for one connection end of the battery and a "−" sign may be shown as AR near the location for the other connection end of the battery.

The assembly instructions as AR may include words, symbols, arrows, and/or a picture that is displayed superimposed over a view of the object. A picture may show a view of the screw being fully screwed or screwed in the correct location. These assembly instructions as AR may include a video of a person properly installing the screws. The video may be displayed in a screen region near or adjacent to a viewpoint of the inspection area or the inspection point. Thus, the video may take up a sub-portion of the entire display screen and not the entire display screen. The augmented reality may include a moving arrow showing a direction of proper screw insertion.

In step 604 of the assembly step sub-process 600, an assembly step or a correction step is performed. This assembly step or correction step may be performed by the program user who is also operating the display screen and/or camera. Examples of such assembly or performance may be an assembly worker screwing in four C34 screws into a base board, inserting a battery with correct polarity, or applying pressure into the heatsink. A user may perform the step 604 using their hands and with or without an additional tool.

In step 606 of the assembly step sub-process 600, an additional image is taken and/or audio is recorded after the assembly step or correction step of step 604 is performed. This taking of the additional image for step 606 may include taking video images of the object. The recording of audio may include using a microphone connected to the edge device, e.g., to the computer 102 that is mobile and has a screen, to capture sound recordings of the object, e.g., of the object being operated. An engine running is an example of the sound of an object being recorded to perform the inspection. A user may press a button on a keyboard or touch a GUI button on a touch screen to actuate image capturing by the camera or sound recording by the microphone. Alternatively, images or videos or sound may be constantly captured or recorded and uploaded by the camera of the augmented reality guidance program 110a so that step 606 may occur automatically after the assembly or correction performance in step 604. For a constant mode a user may pause or interrupt picture taking by actuating a pause button via a keyboard or the touch screen.

In step 608 of the assembly inspection step sub-process 600, an evaluation is performed via a machine learning model using the additional image and/or audio file taken in step 606 as an input. The machine learning model may be one of those generated in step 212 of the guidance procedure creation process 200. A different machine learning model may be used every time that step 608 is repeated for different user interaction points with the object, i.e., through repeats of the augmented reality guidance process 300 and of the user interaction guidance process 400 for different interaction points of the object.

The output of the machine learning model may indicate an assembly step approval at the inspection point or some error of the assembly at the inspection point. For an inspected object, the output may be that no problems or errors with the assembly step are identified. Alternatively, the output may be a defect is identified at the inspection point. For example, some unperformed or incomplete process may be identified at the inspection point. For example, the machine learning model may recognize from the image or images that one or more of the screws were partially screwed in but not completely screwed in. The machine learning model may recognize that a battery was installed with a reversed polarity or with one end but not two ends connected. The output of the machine learning model may be displayed as a text box or as plain letters with no surrounding box superimposed over a view of the object on the screen.

In step 610 of the assembly inspection step sub-process 600, a determination is made whether the output from the machine learning model evaluation of step 608 indicates a correct performance of the assembly step or of a correction step. The processor 104 may recognize, interpret, and/or evaluate the output of the machine learning model. If a correct performance is indicated, then the assembly step sub-process 600 may conclude by proceeding to flowchart point D. FIG. 4 shows in the user interaction guidance process 400 a flowchart point D as a return point from the assembly inspection step sub-process 600. If a correct performance is not indicated, then the assembly step sub-process 600 may proceed to step 612.

In step 612 of the assembly step sub-process 600, assembly correction instructions are received as augmented reality on the screen. The augmented reality may include words, symbols, arrows, and/or a picture that is/are displayed superimposed over a view of the object. If a screen is not completely screwed or is screwed in a wrong location, a picture may be displayed showing a view of the screw being fully screwed or screwed in the correct location. This augmented reality may include a video of a person properly installing the screws. The video may be displayed in a screen region near or adjacent to a viewpoint of the inspection area or the inspection point. The augmented reality may include a moving arrow showing a direction of proper screw insertion. The augmented reality guidance program 110a, 110b may include the correction instructions stored in its memory or may search the web and find video and/or image of the object and/or object component to display in an overlaid manner over the object view as augmented reality.

After step 612 of the assembly step sub-process 600, step 604 of the assembly step sub-process 600 may be repeated by the correction step being performed. The correction instructions received in step 612 may instruct as to which correction step to perform for this repeat of step 604. After the performance of the correction in step 604, then steps 606, 608, and 610 may be repeated.

Thus, the assembly step sub-process 600 shows an iterative loop that may be repeated until the augmented reality guidance program 110a, 110b indicates that the assembly step was correctly performed either in the first instance or after repeated attempts. If the loop is ended by the assembly step being performed correctly or by the augmented reality guidance program identifying a correct performance of the assembly step, then the assembly step sub-process 600 may conclude as indicated at flowchart point D so that a remainder of the user interaction guidance process 400 may be completed or undertaken. FIG. 4 shows in the user interaction guidance process 400 a flowchart point D as a return point from the assembly inspection step sub-process 600.

The machine learning model-based visual inspection that occurs as part of the assembly step sub-process 600 may occur with the user manually triggering the visual inspection. The manual triggering may occur by the user touching a GUI trigger button on a touch screen or pressing a key on a keyboard.

In at least some embodiments the outputs from steps 506 and 610 may be displayed on the screen of the edge device. For example, the outputs may be displayed as augmented reality which is overlaid over a view of the object being shown currently on the display screen.

Supplemental sensors besides cameras may be incorporated for the performance of the augmented reality guidance process 300. A LIDAR sensor and/or an acoustic sensor may also be used, in addition to the camera, to obtain information about the status of an object and whether that object has a defect or can be repaired.

An augmented reality guidance process 300 may be performed to inspect all four tires of an automobile. The checking with the stored 3D model and machine learning models may be used in this embodiment to confirm that all four tires were inspected instead of one of the tires alone being inspected four times. The location machine learning model may confirm the location of each tire before an inspection is verified.

It may be appreciated that FIGS. 2-6 provide only illustrations of some embodiments and do not imply any limitations with regard to how different embodiments may be implemented. Many modifications to the depicted embodiment(s), e.g., to a depicted sequence of steps, may be made based on design and implementation requirements.

Figure 7:
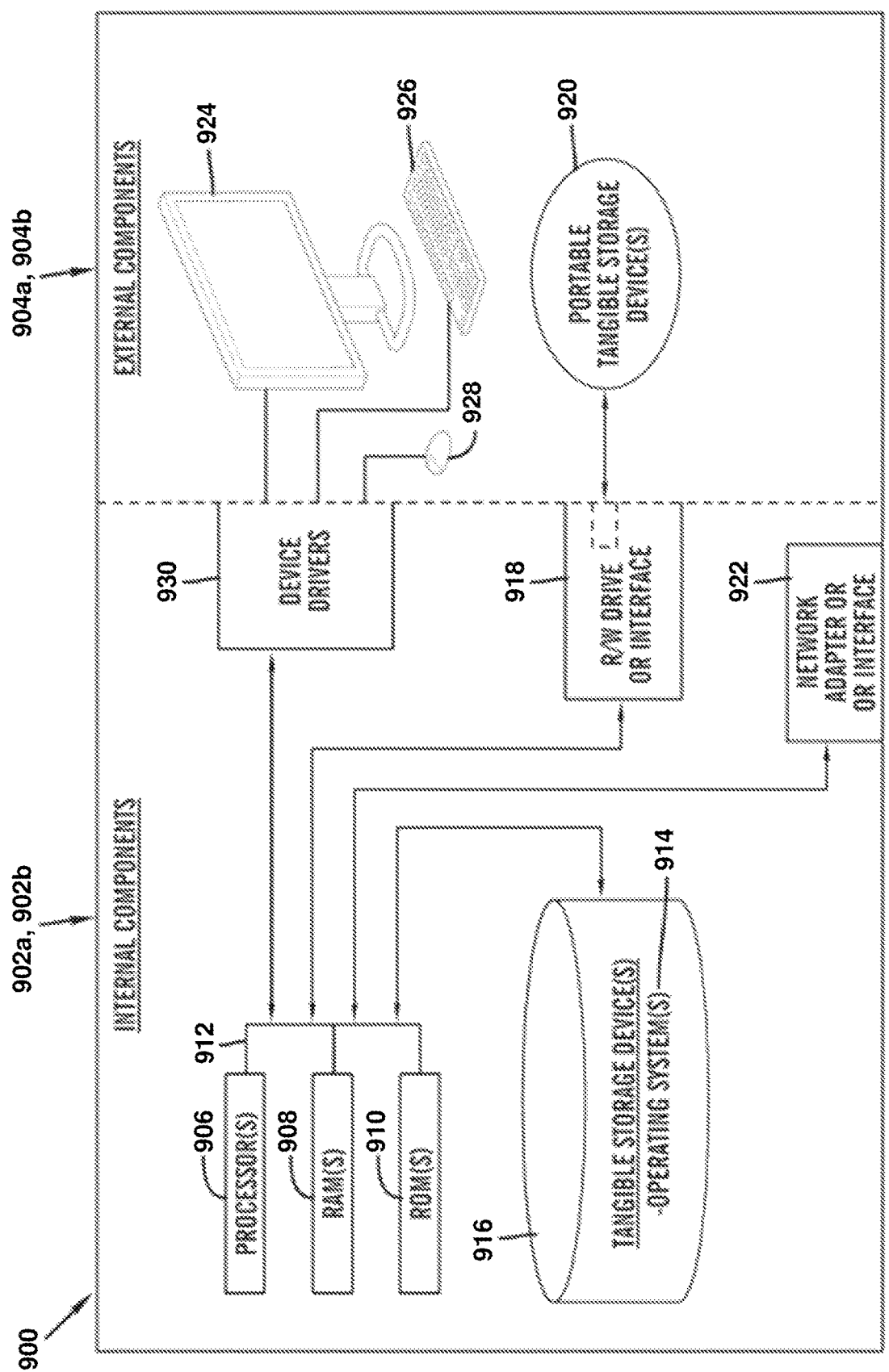
FIG. 7 is a block diagram of internal and external components of computers, phones, and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and server 112 may include respective sets of internal components 902a, 902b and external components 904a, 904b illustrated in FIG. 7. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108a, and the augmented reality guidance program 110a in client computer 102, the software program 108b and the augmented reality guidance program 110b in server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108a, 108b and the augmented reality guidance program 110a, 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108a and the augmented reality guidance program 110a in client computer 102, the software program 108b and the augmented reality guidance program 110b in the server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108a, 108b and the augmented reality guidance program 110a in client computer 102 and the augmented reality guidance program 110b in server 112 are loaded into the respective hard drive 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
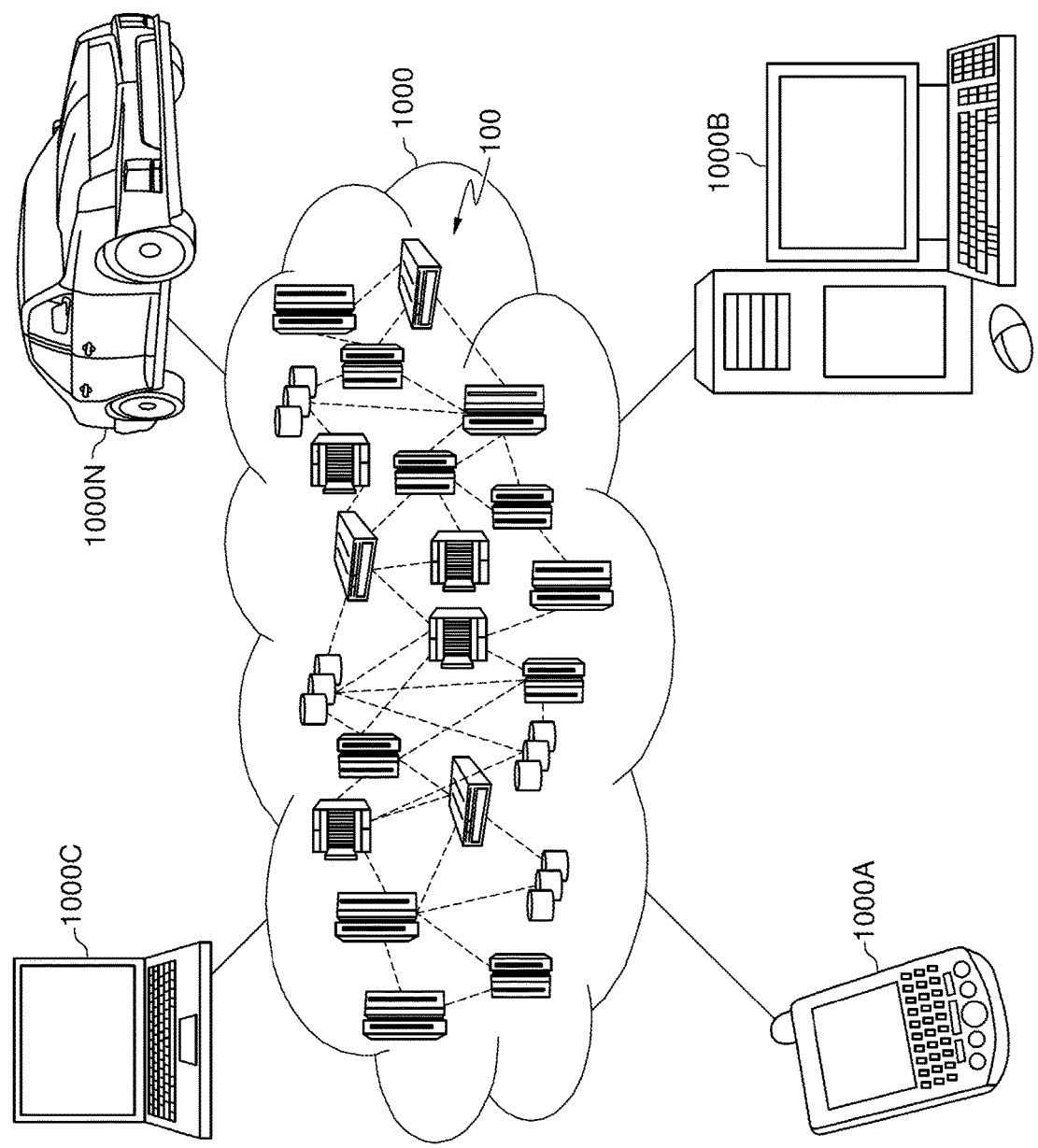
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1900 can communicate with any type of computerized device over any type of network and/or network addressable connection (e.g., using a web browser).

Figure 9:
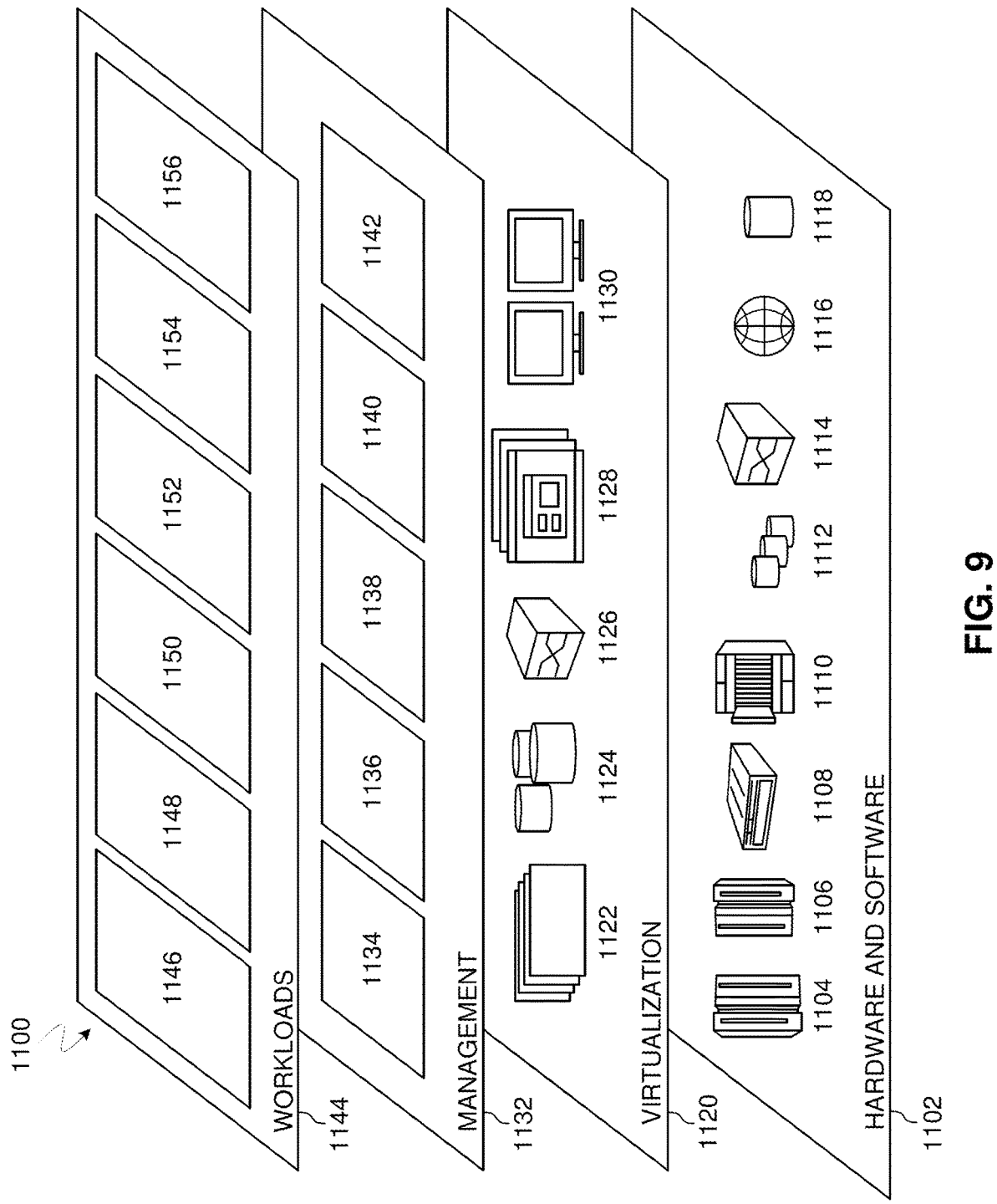
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and text document bias identification and correction 1156. An augmented reality guidance program 110a, 110b provides a way to improve assembly in manufacturing, troubleshooting for a system, or repair of a system by harnessing a machine learning model that can compare inspection pictures to a stored 3D model and can provide visual guidance for an assembly worker or repair person on a screen.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for augmented reality guidance, the method comprising:
    displaying camera orientation instructions as augmented reality on a display screen of a device, the device further comprising a camera and being portable, the display screen also showing a view of a manufacturable object as currently captured by the camera, the manufacturable object being external to the device;
    taking, via the camera, a confirmation image of the manufacturable object after a user follows the camera orientation instructions;
    inputting the confirmation image to a first machine learning model so that a first output of the first machine learning model is generated;
    receiving the first output of the first machine learning model, wherein the first output is selected from the group consisting of an orientation match and an orientation non-match;
    displaying the first output of the first machine learning model on the display screen of the device;
    in response to the first output being the orientation match, receiving additional instructions comprising at least one word directing user interaction with the manufacturable object and comprising an operation instruction to operate the manufacturable object for a sound check;
    displaying the at least one word and the operation instruction on the display screen of the device as further augmented reality;
    capturing, via the camera, an image of the manufacturable object regarding the user interaction directed by the at least one word;
    recording, via a microphone of the device, a sound of the manufacturable object while the manufacturable object is being operated;
    inputting the captured image and the recorded sound to a second machine learning model so that a second output of the second machine learning model is generated, the second machine learning model having been trained with a first recorded sound and a second recorded sound, the first recorded sound being indicative of correct operation of the manufacturable object, and the second recorded sound being indicative of the manufacturable object not functioning correctly;
    receiving the second output from the second machine learning model; and
    displaying the second output on the display screen as additional augmented reality.

2. The method of claim 1, wherein the user interaction comprises an assembly step; and
    wherein the captured image regarding the additional instructions comprises an image of assembled components that were assembled in the assembly step.

3. The method of claim 2, wherein the second output from the second machine learning model comprises at least one member selected from the group consisting of an approval of the assembly step and an error in the assembly step.

4. The method of claim 1, further comprising training the second machine learning model by submitting pictures of different versions of a component of the manufacturable object, wherein the user interaction occurs with respect to the component.

5. The method of claim 1, wherein the second output from the second machine learning model comprises at least one member selected from the group consisting of an approval of an operation of the manufacturable object and an error in the operation of the manufacturable object.

6. The method of claim 1, wherein the second output from the second machine learning model comprises at least one member selected from the group consisting of an approval of an operation of the manufacturable object and an error in the operation of the manufacturable object.

7. The method of claim 1, further comprising:
    taking, via the camera of the device, an initial image of the manufacturable object;
    inputting the initial image into an object match machine learning model so that an object match output of the object match machine learning model is generated; and
    receiving the object match output, wherein the object match output is selected from the group consisting of an object match and an object non-match, and wherein the object match confirms that the manufacturable object in the view currently captured by the camera matches a guidance procedure selected from a library.

8. The method of claim 7, further comprising:
    in response to the object match output being an object match, superimposing a picture of a three-dimensional image of the manufacturable object onto the display screen of the device to demonstrate the object match.

9. The method of claim 1, wherein the additional instructions further comprise a cable image of a cable and an arrow for connecting the cable to a port of the manufacturable object, and wherein the cable image and the arrow are displayed on the display screen of the device as other augmented reality.

10. The method of claim 1, wherein the camera orientation instructions comprise an X-Y-Z coordinate scale and an additional orientation instruction.

11. The method of claim 1, wherein the camera orientation instructions comprise a zoom instruction to zoom the view of the camera in or out.

12. The method of claim 1, wherein the additional instructions further comprise a video depicting a correct interaction with the manufacturable object, and wherein the video is displayed on the display screen of the device as other augmented reality.

13. A computer system for augmented reality guidance, the computer system comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

displaying camera orientation instructions as augmented reality on a display screen of a device, the device further comprising a camera and being portable, the display screen showing a view of a manufacturable object as currently captured by the camera, the manufacturable object being external to the device;

taking, via the camera, a confirmation image of the manufacturable object after a user follows the camera orientation instructions;

inputting the confirmation image to a first machine learning model so that a first output of the first machine learning model is generated;

receiving the first output of the first machine learning model, wherein the first output is selected from the group consisting of an orientation match and an orientation non-match;

displaying the first output of the first machine learning model on the display screen of the device;

in response to the first output being the orientation match, receiving additional instructions comprising at least one word directing user interaction with the manufacturable object and comprising an operation instruction to operate the manufacturable object for a sound check;

displaying the at least one word and the operation instruction on the display screen of the device as further augmented reality;

capturing, via the camera, an image of the manufacturable object regarding the user interaction directed by the at least one word;

recording, via a microphone of the device, a sound of the manufacturable object while the manufacturable object is being operated;

inputting the captured image and the recorded sound to a second machine learning model so that a second output of the second machine learning model is generated, the second machine learning model having been trained with a first recorded sound and a second recorded sound, the first recorded sound being indicative of correct operation of the manufacturable object, and the second recorded sound being indicative of the manufacturable object not functioning correctly;

receiving the second output from the second machine learning model; and displaying the second output on the display screen as additional augmented reality.

14. The computer system of claim 13, wherein the user interaction comprises at least one member selected from the group consisting of an assembly step, an inspection step, and a troubleshooting step.

15. The computer system of claim 13, wherein the user interaction comprises an assembly step; and
wherein the captured image regarding the additional instructions comprises an image of assembled components that were assembled in the assembly step.

16. The computer system of claim 13, wherein the second output from the second machine learning model comprises at least one member selected from the group consisting of an approval of an operation of the manufacturable object and an error in the operation of the manufacturable object.

17. A computer program product for augmented reality guidance, the computer program product comprising a computer-readable storage medium having program instructions embodied therewith, wherein the program instructions are executable by a computer system to cause the computer system to perform a method comprising:

displaying camera orientation instructions as augmented reality on a display screen of a device, the device further comprising a camera and being portable, the display screen also showing a view of a manufacturable object as currently captured by the camera, the manufacturable object being external to the device;

taking, via the camera, a confirmation image of the manufacturable object after a user follows the camera orientation instructions;

inputting the confirmation image to a first machine learning model so that a first output of the first machine learning model is generated;

receiving the first output of the first machine learning model, wherein the first output is selected from the group consisting of an orientation match and an orientation non-match;

displaying the first output of the first machine learning model on the display screen of the device;

in response to the first output being the orientation match, receiving additional instructions comprising at least one word directing user interaction with the manufacturable object and comprising an operation instruction to operate the manufacturable object for a sound check;

displaying the at least one word and the operation instruction on the display screen of the device as further augmented reality;

capturing, via the camera, an image of the manufacturable object regarding the user interaction directed by the at least one word;

recording, via a microphone of the device, a sound of the manufacturable object while the manufacturable object is being operated;

inputting the captured image and the recorded sound to a second machine learning model so that a second output of the second machine learning model is generated, the second machine learning model having been trained with a first recorded sound and a second recorded sound, the first recorded sound being indicative of correct operation of the manufacturable object, and the second recorded sound being indicative of the manufacturable object not functioning correctly;

receiving the second output from the second machine learning model; and displaying the second output on the display screen as additional augmented reality.

18. The computer program product of claim 17, wherein the user interaction comprises at least one member selected from the group consisting of an assembly step, an inspection step, and a troubleshooting step.

19. The computer program product of claim 17, wherein the user interaction comprises an assembly step; and
wherein the captured image regarding the additional instructions comprises an image of assembled components that were assembled in the assembly step.

20. The computer program product of claim 19, wherein the second output from the second machine learning model comprises at least one member selected from the group consisting of an approval of the assembly step and an error in the assembly step.

* * * * *